Jan. 4, 1938.  E. A. PELTON  2,104,166
METHOD OF MAKING A GLASS SEAL
Filed May 1, 1934  2 Sheets-Sheet 1
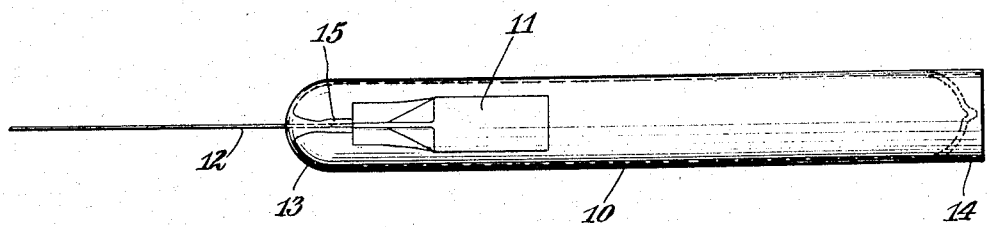
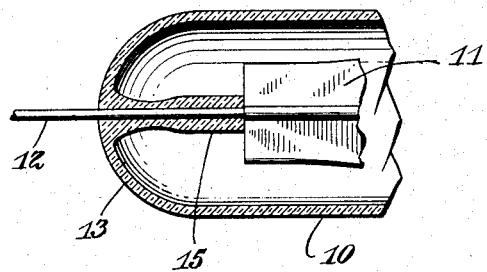
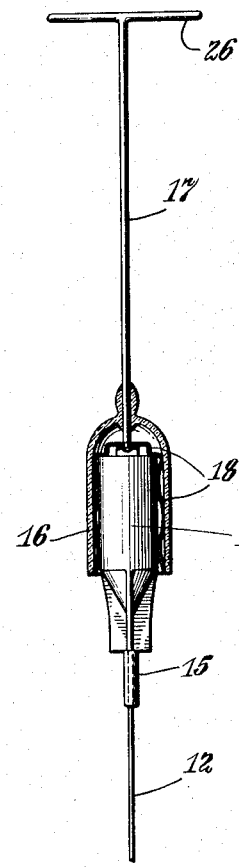
INVENTOR
E. A. PELTON
BY M. F. Reges
ATTORNEY

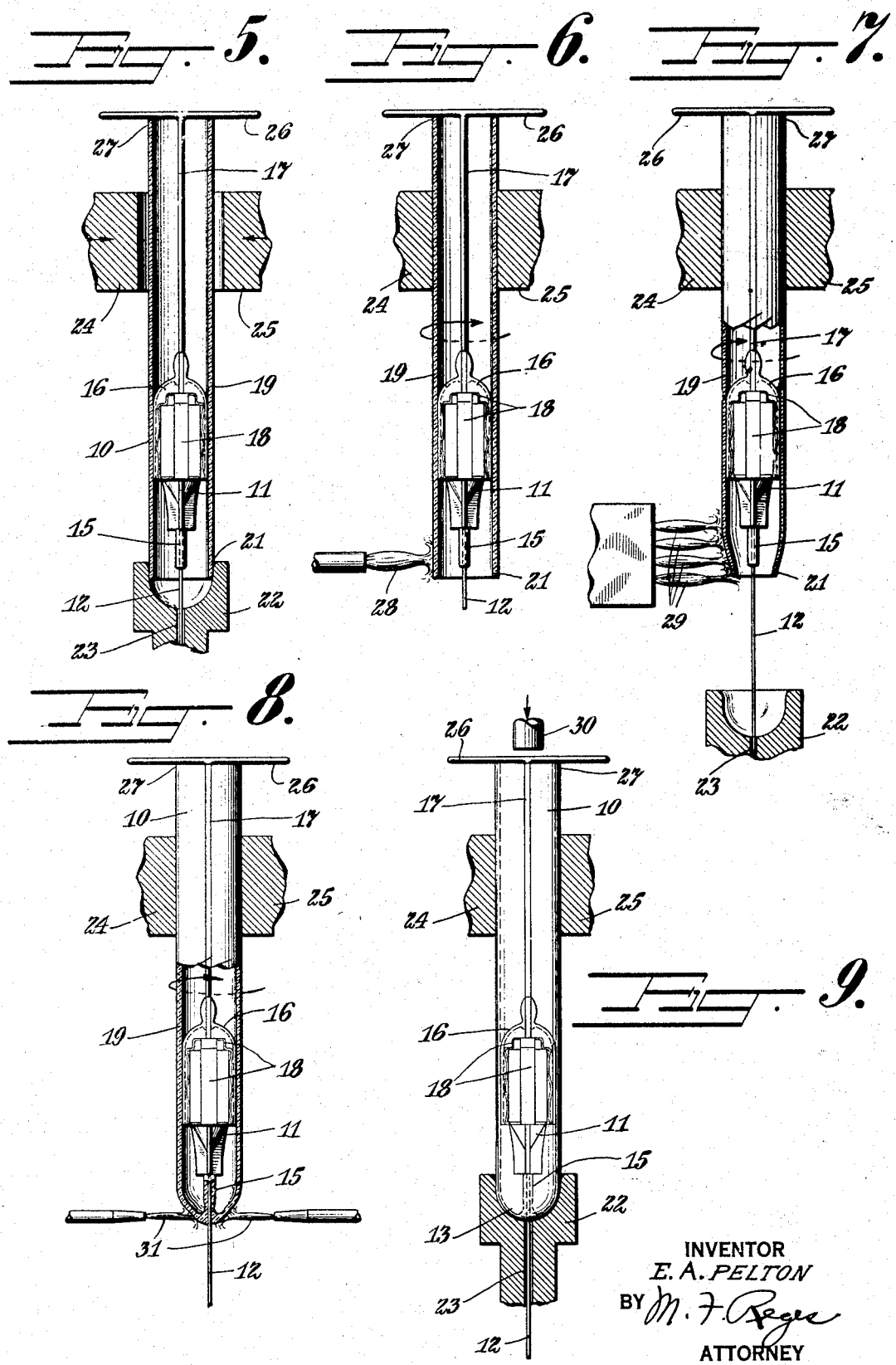

Patented Jan. 4, 1938

2,104,166

UNITED STATES PATENT OFFICE 2,104,166

METHOD OF MAKING A GLASS SEAL

Edward A. Pelton, Newark, N. J., assignor, by mesne assignments, to Westinghouse Electric and Manufacturing Company, East Pittsburgh, Pa., a corporation of Pennsylvania Application May 1, 1934, Serial No. 723,321

8 Claims. (Cl. 49—78)

This invention relates to the manufacture of vacuum electrical devices in which a metallic conductor is sealed in the wall of a vitreous vessel and more particularly to the manufacture of discharge lamps in which an electrode is carried on a metallic support sealed in the wall of a glass vessel.

An important part of the manufacture of discharge lamps as for example the well known neon or similar type of lamp, is the fabrication of the electrodes and it has become the practice to manufacture and sell electrodes as separate articles of manufacture for use in the making of discharge lamps.

Electrodes for the above purpose include a vitreous vessel in the form of a short glass tubular section closed at one end and sealed to an electrode support, and open at the other end, or the other end may be closed to protect the electrode from the atmosphere.

These electrodes are sold for use in making discharge devices and a vessel containing an electrode is sealed to each end of a glass tube of any length depending on the use to which the lamp is to be put.

Co-pending application Serial No. 662,273, filed March 23, 1933 now Patent No. 2,029,013, dated January 28, 1936, and assigned to the present assignee, shows an electrode of the same construction as disclosed herein. The present method aims to improve the manufacture of such electrode units and, although especially adapted for use with a construction such as shown in the said copending application the method, may be used with other forms of electrodes.

Heretofore, when sealing a conductor in the wall of a tubular glass vessel it was necessary to provide the vessel with a reentrant glass portion which was not only a costly operation but did not give the desired strength, often resulting in cracks, particularly since these electrode units are handled and subjected to comparatively rough treatment during packing and transportation.

It is an object of the present invention to provide an electrode unit of rugged construction free from strains.

Another object of the invention is to provide an electrode unit with a unitary seal construction in which the electrode support is protected and reinforced by a layer of vitreous material.

A further object of the invention is to provide a simple and effective method of sealing a conductive support in the wall of a vitreous vessel.

Other objects and advantages of the invention will be more clearly understood by reference to the following description together with the accompanying drawings in which, Fig. 1 is a side view of an electrode unit constructed in accordance with the present invention;

Fig. 2 is an enlarged cross sectional view showing an electrode sealed to a glass vessel;

Fig. 3 is a view of the electrode with a sealing sleeve in position;

Fig. 4 is a view of the electrodes supported in a holder;

Fig. 5 is a sectional view of a tubular blank with an electrode supported in position therein;

Fig. 6 is a view similar to Fig. 5 but shows the supporting blank secured by the jaws of a rotating element;

Fig. 7 is a view similar to Fig. 6 showing the blank partly in section and with forming fires to heat the lower end of the blank;

Fig. 8 is a view showing the blank sealed to the support wire of an electrode; and Fig. 9 is a view showing the electrode unit with a mold in position to shape the plastic seal end.

An electrode of the character to which the present invention relates may comprise a tubular glass vessel 10 and an electrode 11, having a conductive support or lead wire 12 sealed through the end wall 13 of the vessel. The electrode as shown in Fig. 1 may be sold with the end 14 open or this end may be sealed closed, as indicated in dotted lines. When the electrode is to be used to make a lamp, the end 14 is sealed to another tubular body of the same diameter, it being understood that an electrode is sealed to each end of the body to provide a complete device.

As shown in the above mentioned co-pending application, the electrode 11 is sealed to the end of the tubular vessel by first providing the end with a reentrant portion in which the conductive support is sealed.

In the present construction an electrode as shown in Fig. 3 is provided with a glass sleeve 15. This sleeve may have an inside diameter only slightly greater than the outside diameter of the wire 12 and may be slipped on the wire with a friction fit. The electrode 11 is then inserted into a holder comprising a cup 16 having a stem or rod 17 extending from the closed end of the cup. The cup may be provided with a spring tension member 18 to hold the electrode in position. The electrode, when in the holder and with the sleeve 15 in place, is positioned in a tubular blank 19 having one end 21 disposed in a shaping mold 22. The mold is provided with an aperture 23 to receive the support wire 12, (see Fig. 5).

A pair of jaws 24 and 25 are provided to grip the blank 19. These jaws may be part of a rotating head such as used in glass working operations and may be operated to rotate the blank with the electrode properly positioned. The position of the electrode is determined by the length of the stem 17 which is provided with a cross-piece 26 arranged to rest on the upper end 27 of the blank. If desirable the cross piece 26 may be provided with a foot piece to rest upon the jaws 25 and 26 to take the weight of the holder off of the blank. The cup 16 is proportioned to slidably fit within the blank 19 and the electrode is held depending in its proper relative position for a sealing operation.

When ready for sealing, the mold 22 is lowered and the blank rotated (see Figs. 6 and 7). A flame 28 is then directed against the end 21 to render it plastic. A second fire in the form of a bank of flames 29 is then directed against the said end to constrict and shape the end. After the wall at the end of the blank has been shaped or contracted to surround the wire 12 a third set of flames 31 is employed to completely fuse the sleeve 15 to the wire 12 and plastic end of the blank, and consolidate the sleeve with the wall of the blank making an integral structure of vitreous material. The mold 22 is then moved to shape the sealed end of the blank to give a round symmetrical form as shown in Fig. 9.

During the molding or shaping operation air under pressure may be supplied by means of pipe 30 to force the plastic glass against the mold. The holder may then be removed and the electrode unit is ready to be used as part of a discharge device. If desirable, the seal may be annealed to remove internal stresses.

It will be noted that the sleeve 15 is so proportioned and arranged that it occupies the space between the lower end of the electrode and the wall of the glass vessel. Thus a rugged support is provided for the electrode and at the same time the wire is completely insulated. Furthermore, by reason of the present method the wall of the blank is thickened around the lower end of the sleeve and a seal of relatively great strength is attained.

Although a preferred embodiment of the invention is shown and described herein, it is to be understood that modifications may be made therein without departing from the spirit and scope of the invention as set forth in the appended claims.

What is claimed:

1. The method of sealing a lead wire in one end of a tubular glass vessel which comprises positioning a portion of the wire in a glass sleeve having an inside diameter only slightly greater than the outside diameter of the wire to provide a friction fit, positioning the sleeve within and adjacent to one end of the vessel to position said sleeve between said wire and the wall of said vessel, heating to soften the said end, and fusing the end to the sleeve and the sleeve to the wire.

2. The method of sealing a lead wire in one end of a tubular glass vessel which comprises surrounding a portion of the wire with a glass sleeve slidable therealong and frictionally held in position, positioning the sleeve within and adjacent to one end of said vessel so that said sleeve is disposed between said wire and the wall of said vessel and heating said end and sleeve to unite said vessel to said sleeve and said sleeve to said wire.

3. The method of sealing the conductive support wire of an electrode to an end of a glass tubular vessel which comprises, surrounding a portion of the support wire with a vitreous sleeve slidable along said wire and frictionally held in position, supporting the electrode with the end of said sleeve in close relation thereto and with the sleeve adjacent to one end of the vessel, heating the vessel to contract the wall thereof into contact with the sleeve, and fusing said wall and sleeve to one another and said wire.

4. The method of sealing the conductive support wire of an electrode to an end of a glass tubular vessel which comprises, surrounding a portion of the support wire with the vitreous layer snugly fitting so as to be frictionally held in position and slidable along said wire, supporting the electrode with said layer adjacent to one end of the vessel, heating the wall at said end of the vessel to contract the same into contact with the layer, and fusing said wall and sleeve at one end of said sleeve to form said wall and said sleeve into a continuous layer and sealed to said wire.

5. The method of sealing the conductive support wire of an electrode to an end of a glass tubular vessel which comprises, surrounding a portion of the support wire with a vitreous tubular sleeve having an inside diameter only slightly larger than the outside diameter of said wire to make a friction fit, supporting the electrode with said sleeve adjacent to one end of the vessel, heating said end of the vessel to contract the same into contact with the sleeve, fusing said end to one end of said sleeve and said sleeve to the wire, positioning a mold about said ends, and directing air under pressure into said vessel to shape said ends in said mold.

6. The method of securing an electrode and associated lead wire to a tubular glass vessel comprising, applying a glass sleeve over said wire, said sleeve being of such a size that it is slidably held in position on said wire by friction, inserting said electrode in a holder having a stem extending therefrom, inserting said holder and electrode in said glass vessel, supporting the electrode in said vessel by means of the stem of said holder with the sleeve having its lower end disposed adjacent the lower end of said vessel, rotating said vessel, heating said vessel and sleeve to cause the lower end of the former to contract about and unite with said sleeve and the latter to fuse to said wire, and removing said holder.

7. The method of securing an electrode and associated lead wire to a tubular glass vessel comprising, applying a glass sleeve over said wire, said sleeve being of such a size that it is slidably held in position on said wire by friction, supporting the electrode in said vessel with the sleeve having its lower end disposed adjacent the lower end of said vessel, rotating said vessel, and heating said vessel and sleeve to cause the lower end of the former to contract about and unite with said sleeve and the latter to fuse to said wire.

8. The method of securing an electrode and associated lead wire to a tubular glass vessel comprising, applying a glass sleeve over said wire, said sleeve being of such a size that it is slidably held in position on said wire by friction, supporting the electrode in said vessel with the sleeve having its lower end disposed adjacent the lower end of said vessel, rotating said vessel, heating said vessel and sleeve to cause the lower end of the former to contract about and unite with said sleeve and the latter to fuse to said wire, applying a mold over the fused lower end of said vessel, and forcing air into said vessel to push the plastic glass against said mold.

EDWARD A. PELTON.